US012102855B2

(12) United States Patent
Geue et al.

(10) Patent No.: US 12,102,855 B2
(45) Date of Patent: Oct. 1, 2024

(54) ELECTRIC VEHICLE UNDER BODY SPRAY NOZZLE

(71) Applicant: SEMPER FIRE LLC, Sharpsburg, GA (US)

(72) Inventors: Andrew Robert Geue, Rio, WI (US); William J. Lawson, Sharpsburg, GA (US); Stephen J. Martin, Bethlehem, PA (US)

(73) Assignee: SEMPER FIRE LLC, Sharpsburg, GA (US)

( * ) Notice: Subject to any disclaimer, the term of this patent is extended or adjusted under 35 U.S.C. 154(b) by 0 days.

(21) Appl. No.: 18/139,716

(22) Filed: Apr. 26, 2023

(65) Prior Publication Data

US 2023/0338762 A1 Oct. 26, 2023

Related U.S. Application Data

(60) Provisional application No. 63/334,748, filed on Apr. 26, 2022.

(51) Int. Cl.

| | |
|---|---|
| ***A62C 31/05*** | (2006.01) |
| ***A62C 3/06*** | (2006.01) |
| ***A62C 3/07*** | (2006.01) |
| ***A62C 3/16*** | (2006.01) |

(52) U.S. Cl.
CPC ................ *A62C 31/05* (2013.01); *A62C 3/06* (2013.01); *A62C 3/07* (2013.01); *A62C 3/16* (2013.01)

(58) Field of Classification Search
CPC .... A62C 3/07; A62C 3/02; A62C 3/06; A62C 3/16; A62C 31/05; A62C 27/00; A62C 3/0292; A62C 25/005; A62C 3/00; A62C 3/0278
See application file for complete search history.

(56) References Cited

U.S. PATENT DOCUMENTS

| | | | | |
|---|---|---|---|---|
| 9,764,174 | B2 * | 9/2017 | Howard, Sr. | A62C 3/0214 |
| 11,207,554 | B2 * | 12/2021 | Hillinger | A62C 31/05 |
| 2003/0150625 | A1 * | 8/2003 | Smith | A62C 3/08 169/56 |
| 2004/0140106 | A1 * | 7/2004 | De Anda-Uribe | A62C 31/24 169/66 |
| 2012/0193108 | A1 * | 8/2012 | Cordani | A62C 3/16 169/15 |

FOREIGN PATENT DOCUMENTS

| | | | | |
|---|---|---|---|---|
| WO | WO-2021190809 | A1 * | 9/2021 | A62C 3/07 |

OTHER PUBLICATIONS

"Skid." Merriam Webster Dictionary, Merriam Webster, 2023, https://www.merriam-webster.com/dictionary/skid. (Year: 2023).*

* cited by examiner

*Primary Examiner* — Christopher R Dandridge
(74) *Attorney, Agent, or Firm* — Thompson Hine LLP

(57) ABSTRACT

A spray nozzle and fan spray system is provided to aid in the cooling and extinguishing of electric vehicle fires. The spray nozzle is configured to be positioned underneath the vehicle, where water is evenly distributed along the underside of the vehicle through a plurality of holes disposed through the side and upper surfaces of the spray nozzle. Simultaneously a fan nozzle may be configured to spray fluid over the top of the vehicle and provides a heat barrier. A method of extinguishing an electrical vehicle fire is also provided that improves the safety of bystanders and fire fighters.

9 Claims, 16 Drawing Sheets

ELECTRIC VEHICLE UNDER BODY SPRAY NOZZLE

RELATED APPLICATIONS

This application claims priority to U.S. Provisional Application No. 63/334,748, entitled "Electric Vehicle Under Body Spray Nozzle," filed on Apr. 26, 2022, the entirety of which is incorporated herein.

RELATED TECHNOLOGY

This application relates to a spray nozzle and fan spray system to aid in the cooling and extinguishing of battery fires in electric vehicles fires and fires occurring in electric vehicle manufacturing plants.

BACKGROUND

Fires along the underside of a vehicle, and more specifically, an electric vehicle such as a car, bus, or tractor trailer, are difficult to safely contain due to the limited space provided beneath the vehicle for maneuvering. Currently, extinguishing fires along the underside of a vehicle usually results in fire fighters either lifting the vehicle off the ground to gain better access or spraying water along the top of the vehicle. Both these methods are problematic because the close proximity required to lift the vehicle threatens the safety of the fire fighters and spraying along the top, more often than not, doesn't actually target the source of the fire. Further, evenly distributing water along the vehicle by either method is difficult to do when the source of water comes from a fire hose. With the growing popularity of electric vehicles, which often contain batteries that can ignite along the underside of the vehicle, a safer and more efficient method of controlling these fires is desirous.

SUMMARY

In embodiments of the invention, an apparatus for containing electric vehicle fires is provided having a spray nozzle with a plurality of holes that evenly distribute fluid along the underside of a vehicle, and wherein the apparatus is configured to slide beneath the vehicle.

In another embodiment, an apparatus for containing electric vehicle fires is provided having a spray nozzle with a plurality of holes that evenly distribute fluid along the underside of a vehicle, and a spray nozzle configured to spray fluid above the vehicle.

In yet another embodiment, a method for containing an electric vehicle fire is disclosed comprising connecting a fan nozzle to a spray nozzle to form a system, sliding the system beneath the vehicle so that the spray nozzle is placed between the axles of the vehicle and the fan nozzle is disposed along the outside of the vehicle, and connecting the system to a water source.

In one embodiment, a spray nozzle for treating electric vehicle fires includes an elongated body, the elongated body having a proximal end comprising an inlet orifice, a closed distal end, and a length extending between the proximal end and the distal end; wherein the length of the elongated body has a thickness and a plurality of holes disposed through the thickness of the length; and wherein each of the plurality of holes are disposed through the thickness at a predetermined angle relative to a vertical axis disposed through a center of the elongated body. The nozzle further includes a cradle configured to receive the length of the elongated body; at least a first brace and a second brace attached to the cradle in a position substantially perpendicular to the length of the elongated body; and at least a first skid attached to the first brace and a second skid attached to the second brace; wherein the first skid and the second skid are substantially parallel to the length of the elongated body.

The plurality of holes may be disposed at a first side surface, top surface, and second side surface of the length of the elongated body, and wherein the predetermined angles of the plurality of holes are configured to be from 200 to −20° relative to the vertical axis of the elongated body. And, in one embodiment, the plurality of holes disposed from the first side surface to the top surface have predetermined angles of about 20° to about 29°, 30° to about 39°, about 40° to about 49°, about 50° to about 59°, about 60° to about 69°, about 70° to about 79°, and about 80° to about 89° relative to the vertical axis and the plurality of holes disposed from the second side surface to the top surface have predetermined angles of about −20° to about −29°, −30° to about −39°, about −40° to about −49°, about −50° to about −59°, about −60° to about −69°, about −70° to about −79°, and about −80° to about −89° relative to the vertical axis.

The spray nozzle may further include a cap that is configured to be removably attached to the distal end of the elongated body. And, the inlet orifice may have a diameter of about 0.20 inch to about 0.75 inch. The nozzle may further include a flow restrictor capable of being disposed within the inlet orifice of the proximal end of the elongated body, the flow restrictor comprising a body configured to fit within the inlet orifice and an opening through at least one surface of the body, wherein the opening is configured to reduce the diameter of the inlet orifice of the elongated body.

In another embodiment, an apparatus for containing electric vehicle fires includes a spray nozzle having an elongated body, the elongated body having a proximal end comprising an inlet orifice, a closed distal end, and a length extending between the proximal end and the distal end; wherein the length of the elongated body has a thickness and a plurality of holes disposed through the thickness of the length; and wherein each of the plurality of holes are disposed through the thickness at a predetermined angle relative to a vertical axis disposed through a center of the elongated body; a cradle configured to receive the length of the elongated body; at least a first brace and a second brace attached to the cradle in a position substantially perpendicular to the length of the elongated body; and at least a first skid attached to the first brace and a second skid attached to the second brace; wherein the first skid and the second skid are substantially parallel to the length of the elongated body. The apparatus may further include a fan nozzle disposed at the proximal end of the spray nozzle and configured to spray fluid in a vertical direction along and above the outside of the vehicle.

In one embodiment, the apparatus further includes at least one pipe configured to be attached to and extend between the proximal inlet end of the spray nozzle and a distal end of the fan nozzle.

In another embodiment, a method of containing an electric vehicle fire includes providing a spray nozzle having an elongated body, the elongated body having a proximal end comprising an inlet orifice, a closed distal end, and a length extending between the proximal end and the distal end; wherein the length of the elongated body has a thickness and a plurality of holes disposed through the thickness of the length; and wherein each of the plurality of holes are disposed through the thickness at a predetermined angle relative to a vertical axis disposed through a center of the elongated body; a cradle configured to receive the length of the elongated body; at least a first brace and a second brace attached to the cradle in a position substantially perpendicular to the length of the elongated body; and at least a first skid attached to the first brace and a second skid attached to the second brace; wherein the first skid and the second skid are substantially parallel to the length of the elongated body. The method may further include attaching the spray nozzle to a water source; positioning the spray nozzle below an underside of the vehicle; and delivering water through the plurality of holes so that the water is directed to the underside of the vehicle at a plurality of predetermined angles.

The method further includes providing a fan nozzle configured to spray water along and above the outside of the vehicle, attaching a length of pipe between a distal end of the fan nozzle and the proximal inlet end of the spray nozzle; and wherein the water source is attached to the proximal inlet end of the spray nozzle through the length of pipe and the fan nozzle.

DETAILED DESCRIPTION

Figure 1:
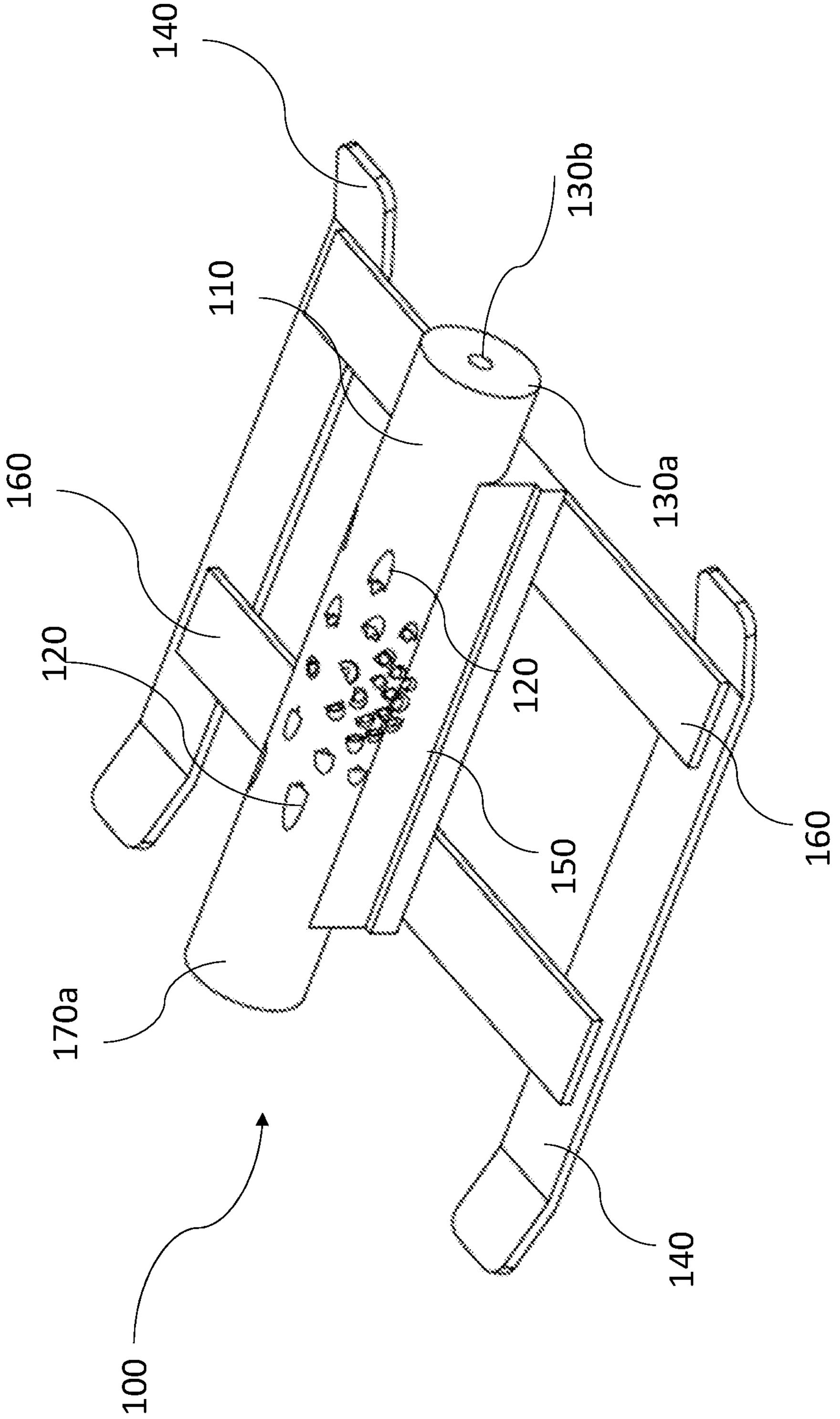
FIG. 1 is a front perspective view of one embodiment of a spray nozzle.
Figure 2:
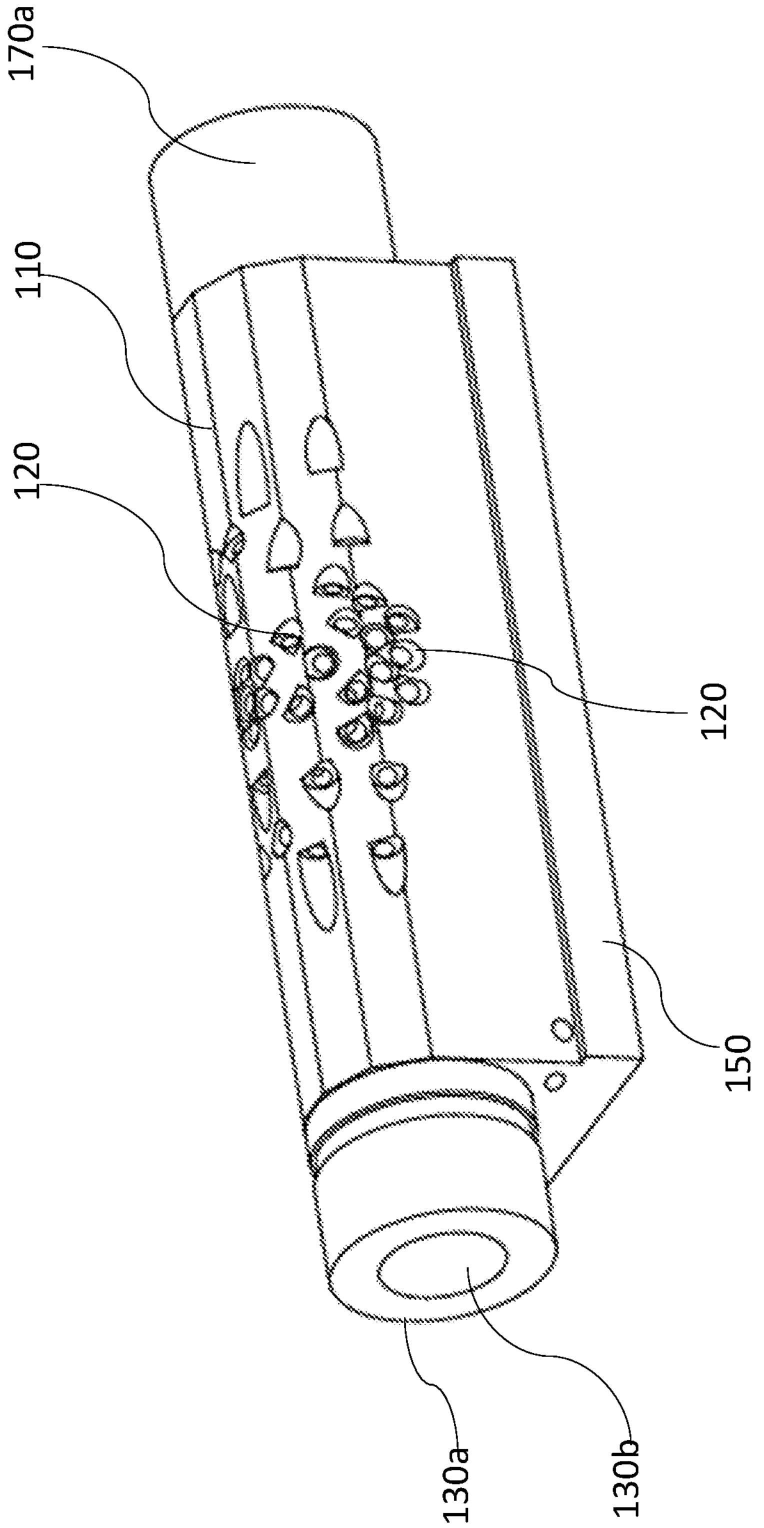
FIG. 2 is a side perspective view of another embodiment of an elongated body and cradle of a spray nozzle.
Figure 3:
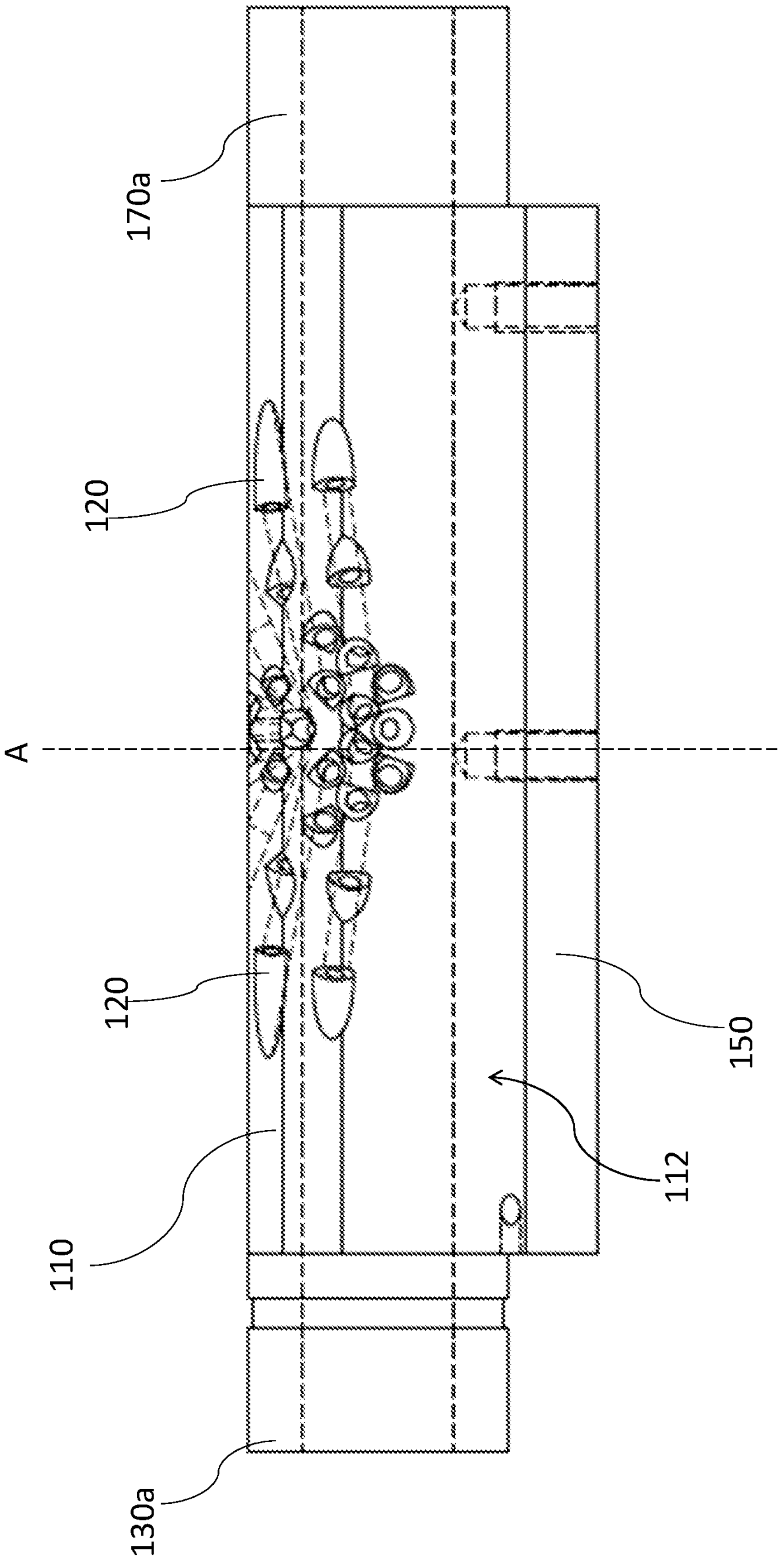
FIG. 3 is a side view of one embodiment of the elongated body and cradle of a spray nozzle.

A spray nozzle 100 for use to cool and/or extinguish vehicle fires is provided. As shown in FIGS. 1-5 and 8-11, the spray nozzle 100 has an elongated tubular body 110 having a length L, a plurality of holes 120, a distal end 170*a*, and an inlet end 130*a*. The elongated tubular body 110 may be fixedly attached via a cradle 150 to a set of braces 160 disposed perpendicular to the elongated body 110. The braces 160 may be used to attach the elongated body 110 and cradle 150 to a set of skids 140, which may be disposed parallel to the body 110.

Fluid, such as water, may enter the spray nozzle 100 through the inlet end 130*a* of the body 110, and exit the body 110 through the plurality of holes 120. The plurality of holes 120 may be configured to allow the fluid to exit the body 110 at desired angles, resulting in a wide and targeted range of spray. In one embodiment, the holes 120 are machined into and through length of the elongated body 110 at predetermined angles. In another embodiment, the elongated body 110 may be formed with the holes 120 formed therein, such as with 3D printing technology. When placed under a vehicle, the spray is accurately distributed over the underside of the vehicle. For electric vehicles with batteries along the underside of the vehicle, this spray distribution may aid in cooling and/or extinguishing a battery fire.

In one embodiment, the elongated body 110 may be shaped and sized to distribute spray in a desired array, such as a cylindrical shape. In one example, the body 110 has a tubular shape with an outer wall having a thickness and a diameter 214, the diameter 214 being about 20-50 mm, an in one embodiment about 40 mm. "About" as used in this embodiment is +/−3 mm. The elongated body 110 may also have a length 218 that may be about 170-200 mm, and in one embodiment, about 185 mm. It should be understood that the elongated body may be any suitable size or shape, such as a cylinder, elongated oval, or rectangle.

The elongated body 110 may be made of any sturdy material that keeps shape and can withstand the heat of a battery fire, such as aluminum, stainless steel, steel, etc. It should be appreciated that alternate shapes, sizes, and materials may be used for the elongated body 110 depending on the desired array of spray.

Figure 8:
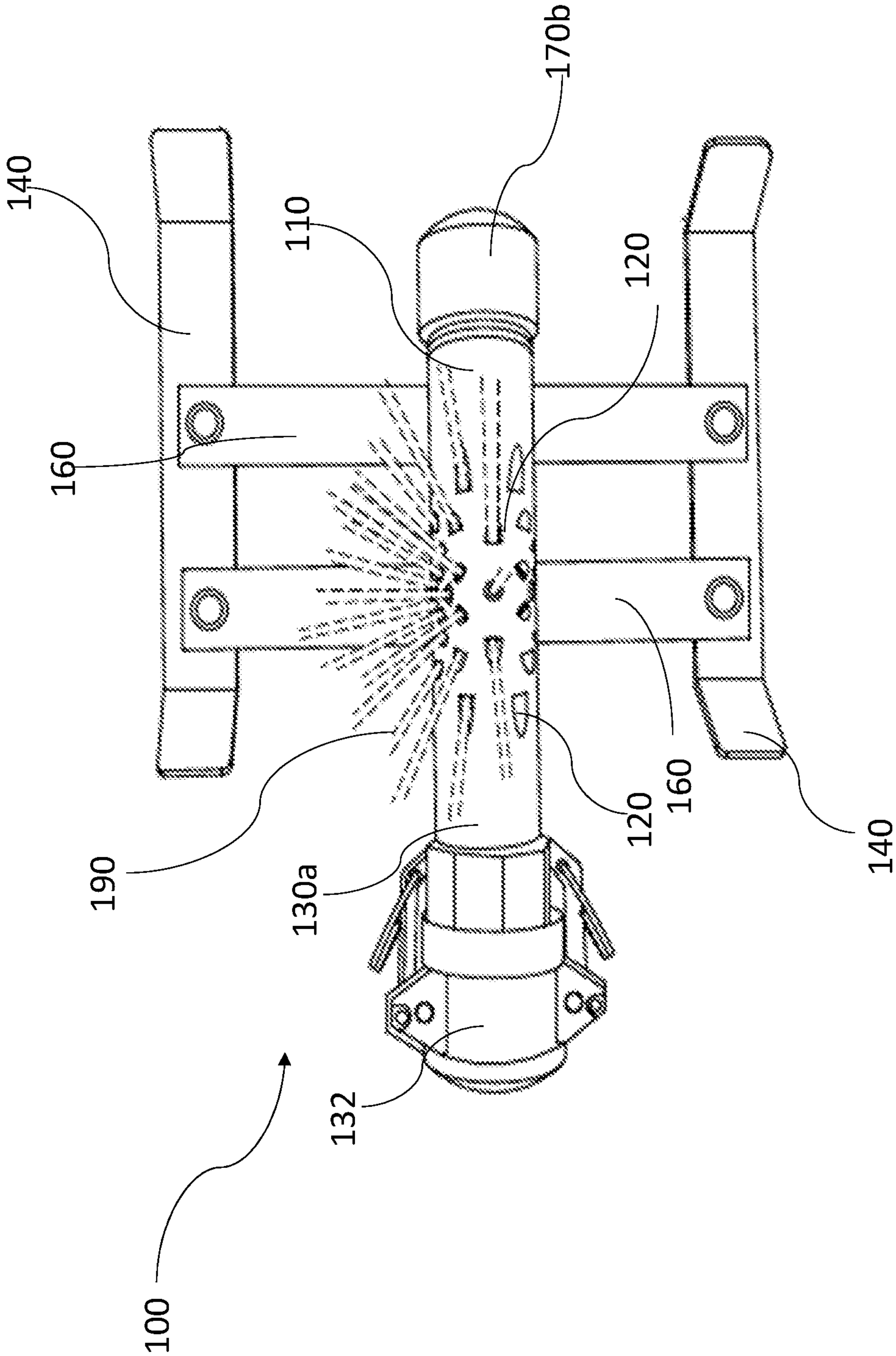
FIG. 8 is an illustration of a top view of one embodiment of a spray nozzle showing an example spray pattern.
Figure 9:
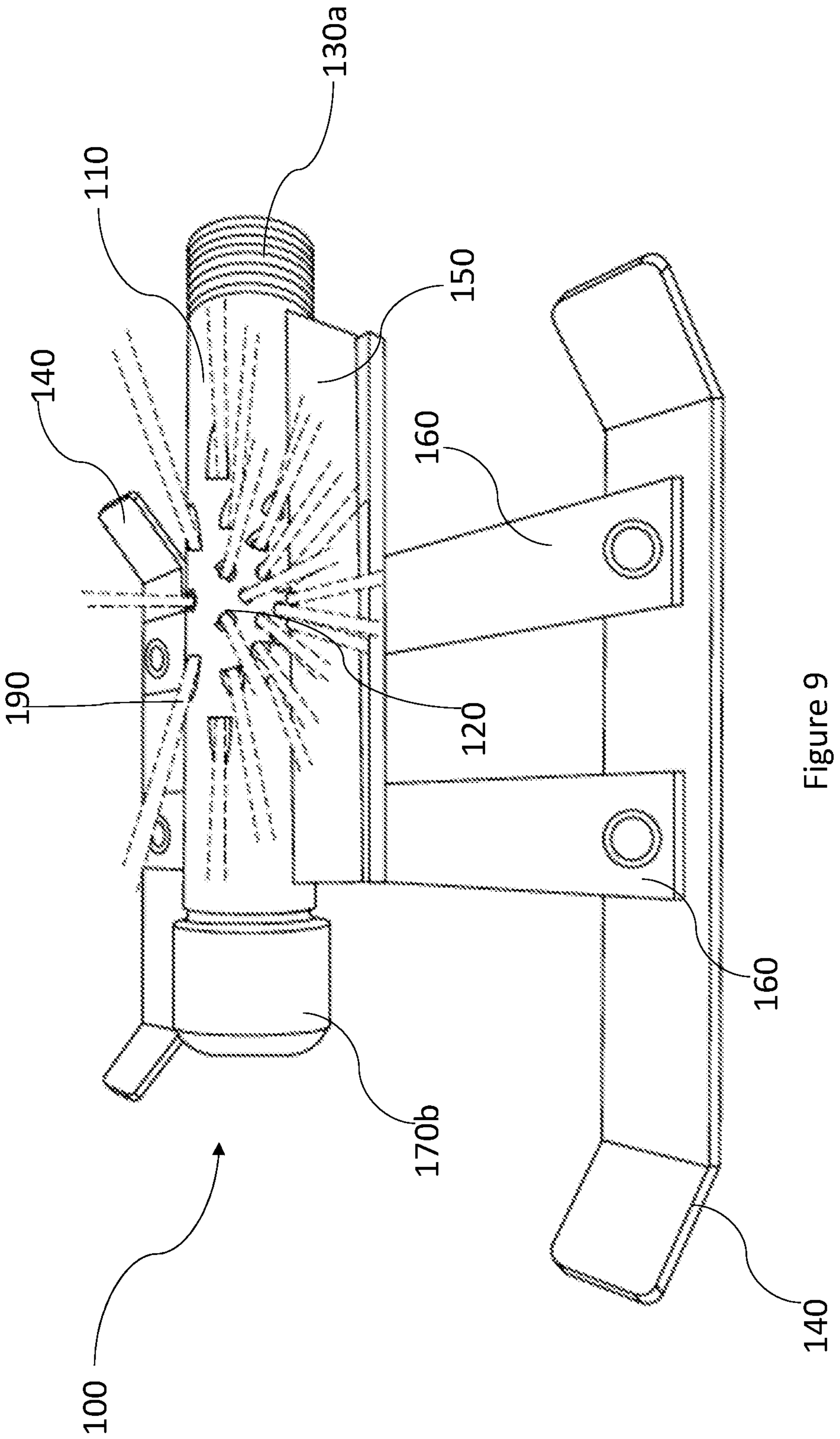
FIG. 9 is an illustration of a side perspective view of one embodiment of a spray nozzle showing an example spray pattern.
Figure 10:
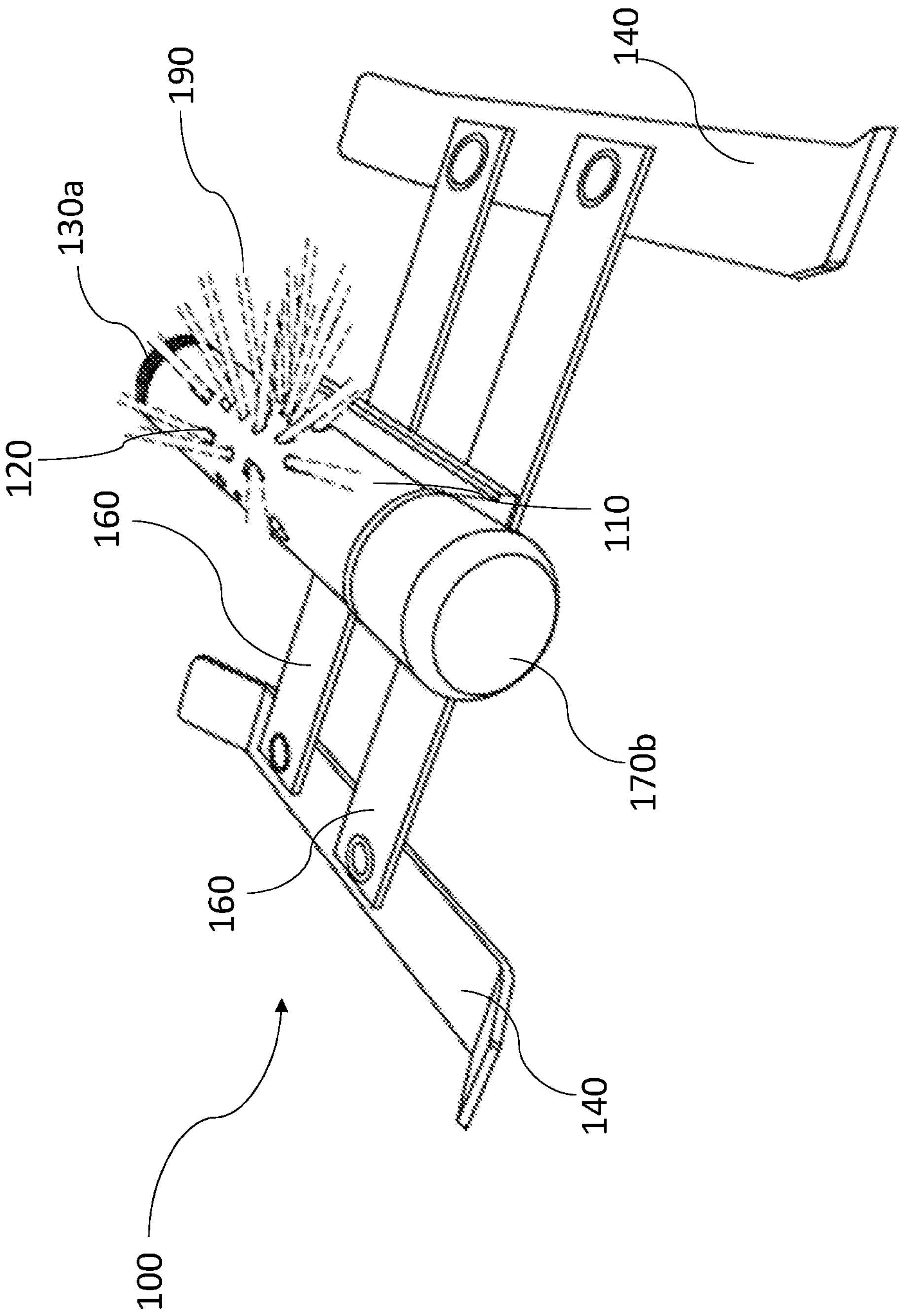
FIG. 10 is an illustration of a back perspective view of one embodiment of a spray nozzle showing an example spray pattern.
Figure 17:
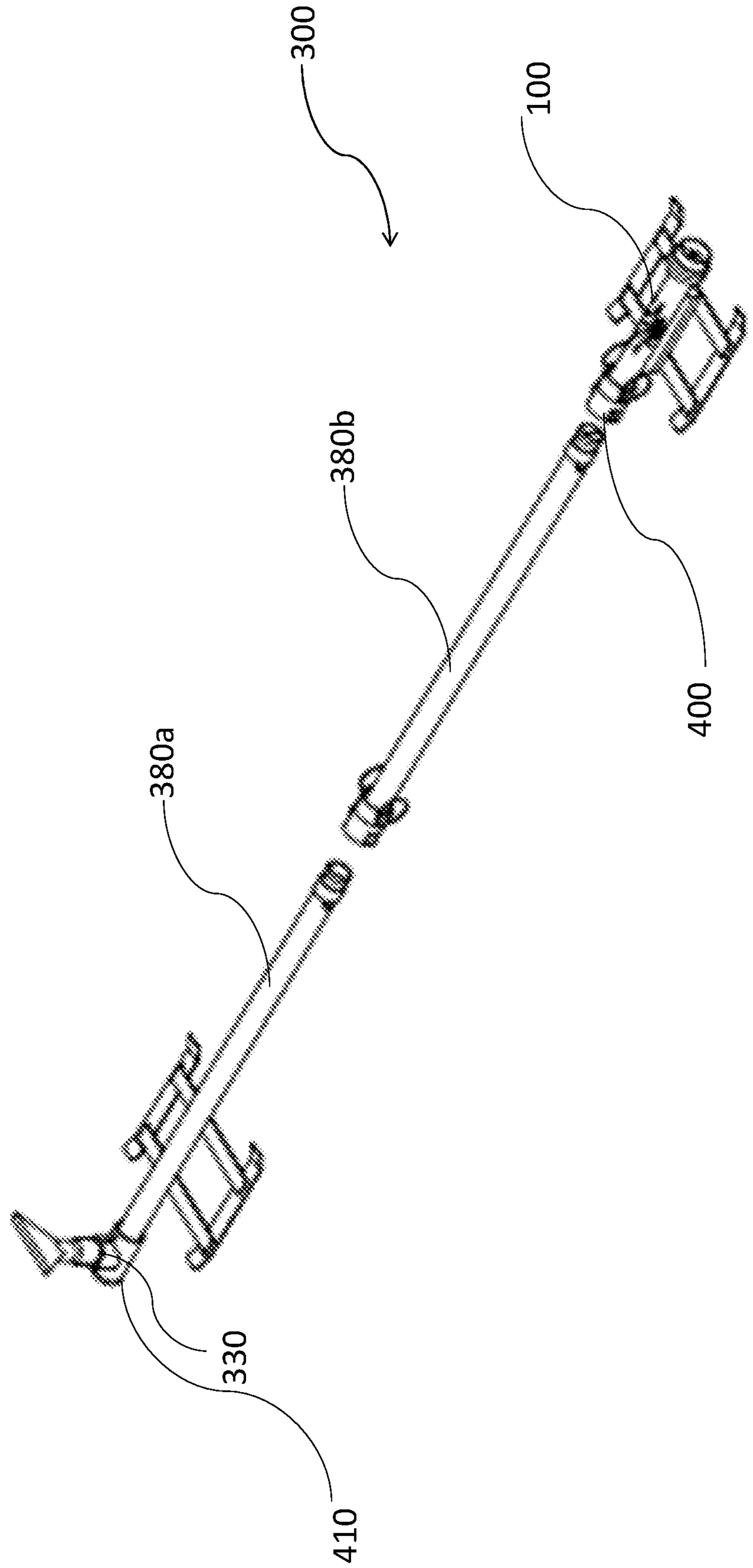
FIG. 17 is a perspective view of one embodiment of a spray nozzle and fan spray system.
Figure 18:
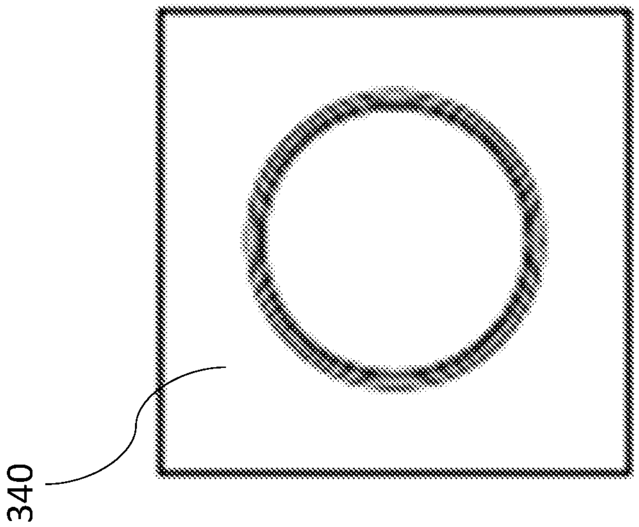
FIG. 18 is a bottom view of one embodiment of a fan nozzle.
Figure 19:
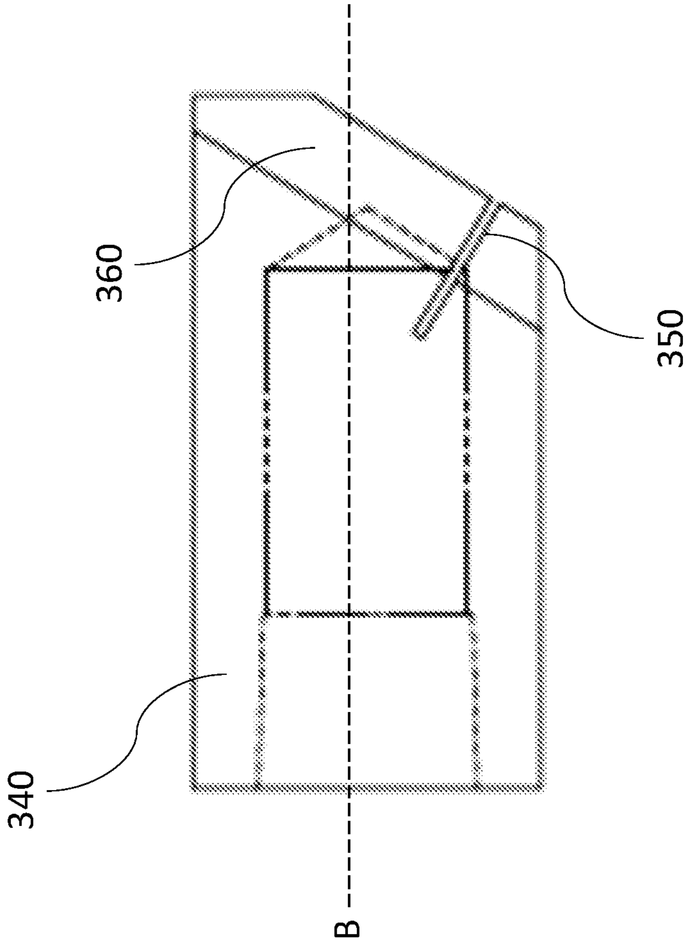
FIG. 19 is a side view of the fan nozzle of FIG. 18.

As shown in FIGS. 8-10, the distal end 170*a* of the elongated body 110 is configured to stop the flow of fluid, redirecting the fluid through the plurality of holes 120. The distal end 170*a* may be formed without an opening or may have an opening that is capped with a barrier 170*b* that can be fixedly and/or removably attached. In one embodiment, the barrier 170*b* is removably attached in the form of a blanking cap. When the barrier 170*b* is removed, the spray nozzle 100 may be flushed and/or cleaned, as shown in FIG. 17.

Figure 11:
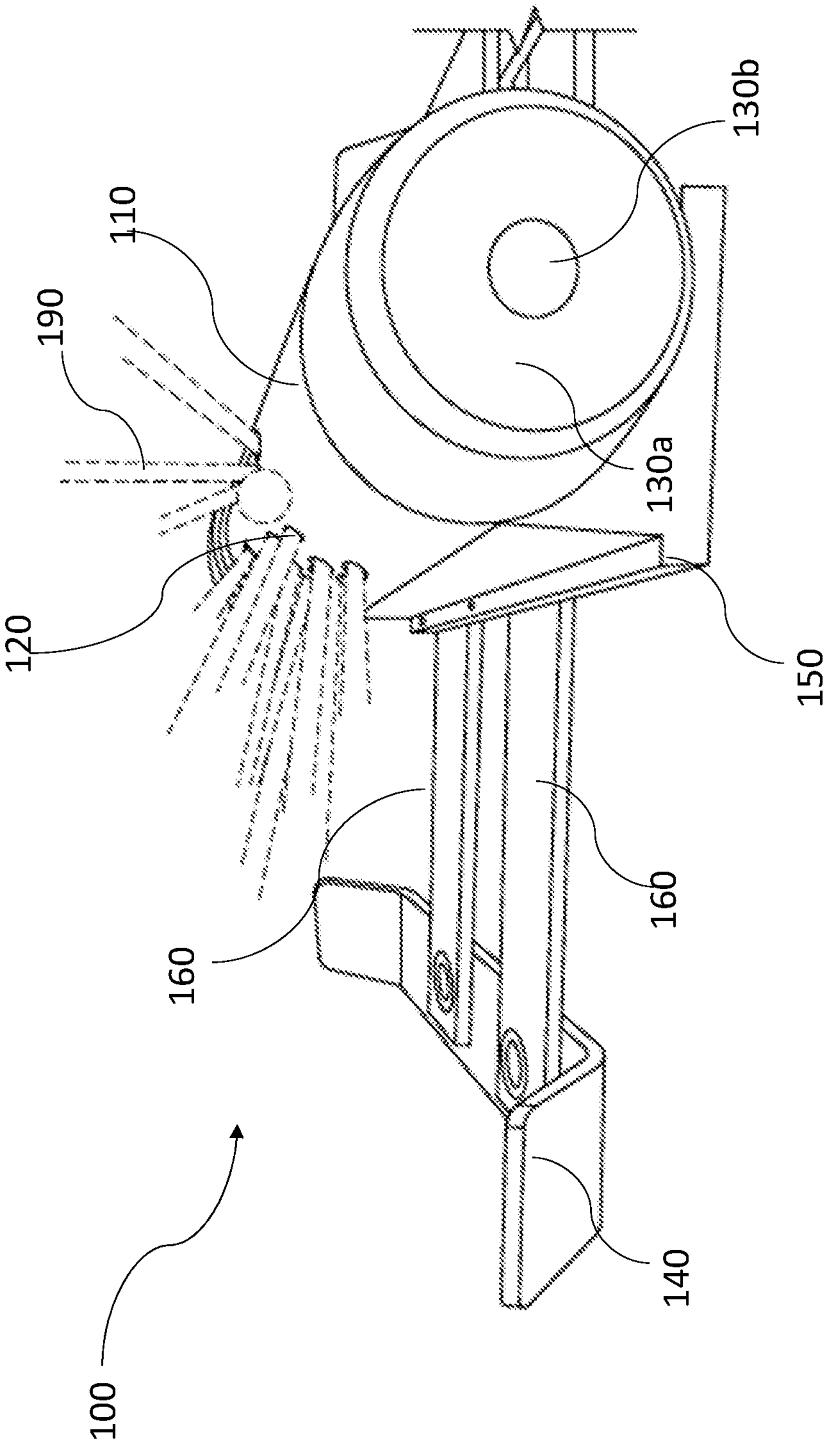
FIG. 11 is an illustration of a front sectional view of one embodiment of a spray nozzle showing an example spray pattern.

As shown in FIGS. 9 and 11, at the inlet end 130*a*, the nozzle 100 is configured to permit fluid to enter the elongated body 110 at a desired flow rate, which may be controlled by the size, shape, or number of an inlet orifice 130*b* (FIGS. 1 and 11). The inlet orifice 130*b* may be formed integrally with the inlet end 130*a* of the elongated body 110. Or the inlet end 130*a* may include a separate component, such as a cap, having an inlet orifice 130*b* therethrough, that may be fixedly or removably attached to the inlet end 130*a*.

Figure 12:
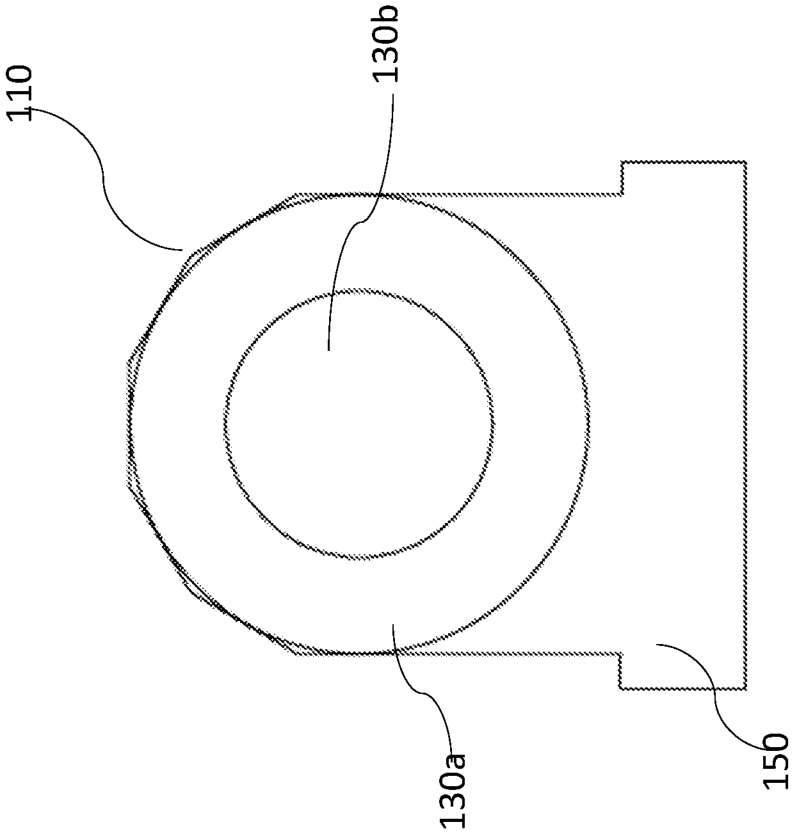
FIG. 12 is a front view of one embodiment of the elongated body and cradle.
Figure 14:
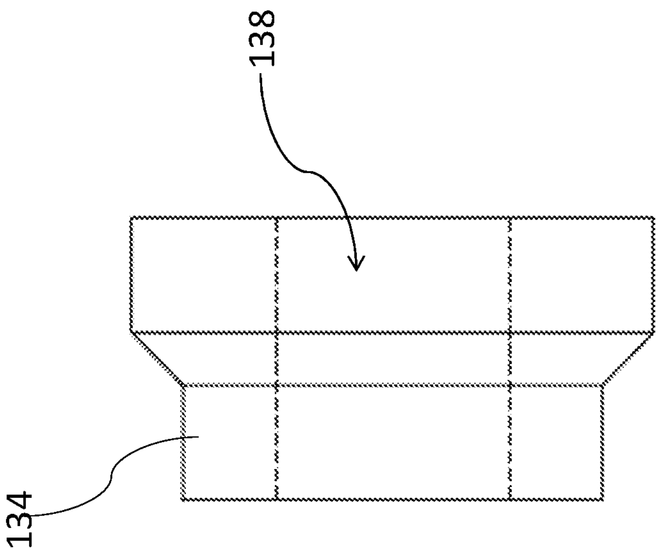
FIG. 14 is a side view of the flow restrictor of FIG. 11.
Figure 13:
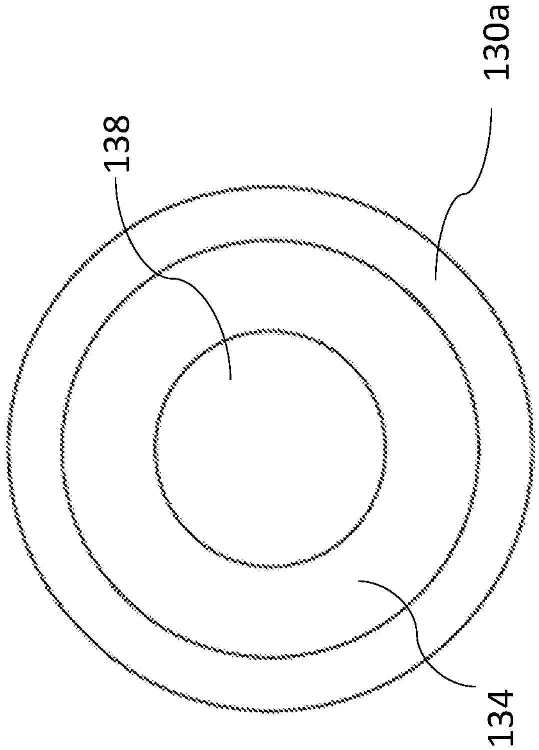
FIG. 13 is a front view of one embodiment of a flow restrictor.
Figure 16:
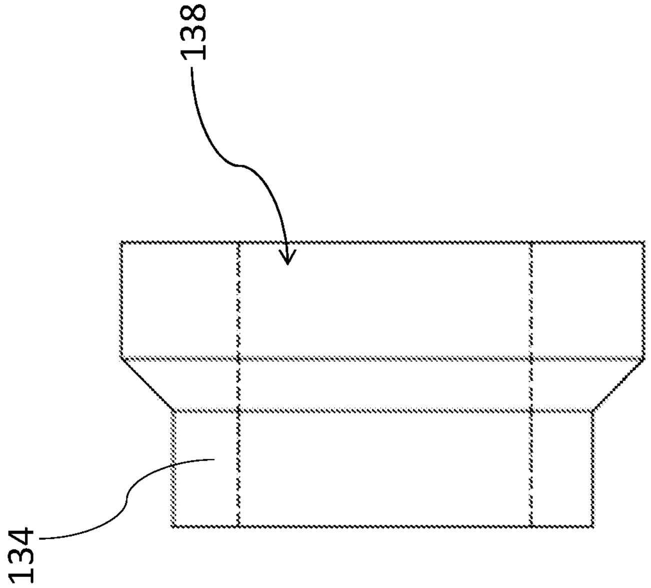
FIG. 16 is a side view of the flow restrictor of FIG. 13.
Figure 15:
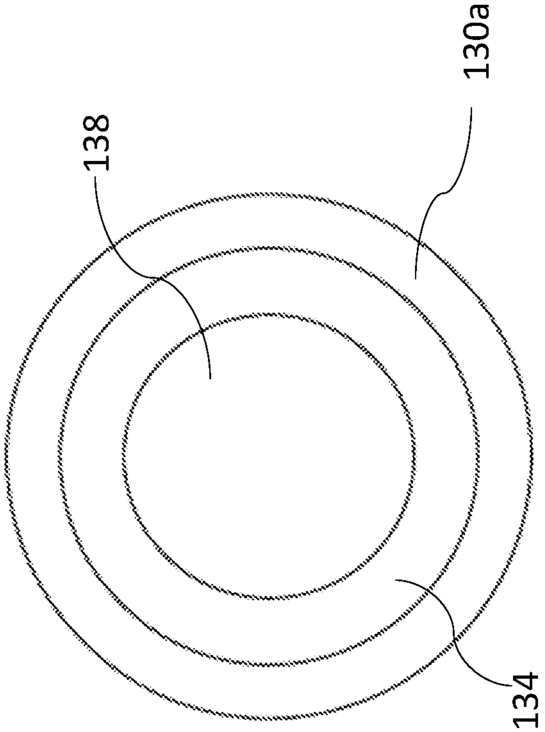
FIG. 15 is a front view of one embodiment of a flow restrictor.

As shown in FIGS. 11 and 12, the inlet orifice 130*b* may have a shape of a disk, circle, oval, etc., and may be configured to be in fluid communication with an inner surface the elongated body 110. In one embodiment, the diameter of the inlet orifice 130*b* may be configured to control the flow rate of fluid into the elongated body 110. For example, the larger the diameter of the orifice 130*b*, the more fluid flows into the body 110. In one embodiment, the diameter of the orifice 130*b* may range from about ⅕ to about ⅔ of an inch, and in another embodiment from about 12 inch to about ¾ inch. At about ¼ of an inch in diameter, with an inlet pressure of 100 PSI, the fluid may flow into the elongated body 110 at about 19 gallons per minute (GPM). "About" as used in this embodiment is +/−⅕ of an inch and +/−1 GPM. At about ½ of an inch in diameter with an inlet pressure of 100 PSI, the fluid may flow into the body 110 at about 75 GPM.

In one embodiment, the flow rate through the orifice 130*b* may be controlled by adding inserts (or flow restrictors) or additional holes in the inlet end 130*a* or the cap disposed at the inlet end 130*a*. The flow restrictors 134, as shown in FIGS. 13-16, may be configured to be friction fit. Or it may be threaded using for example a 1 inch NPT (National Pipe Tapered) thread disposed at mating ends of the elongated body 110 and the flow restrictor 134 and/or a cap at the end of the inlet end 130*a*. In one embodiment, threads may be disposed on the internal surface (not shown) of the inlet end 130*a* of the elongated body 110, with mating threads (not shown) on the outer surface of a flow restrictor 134, so that the flow restrictor 134 sits within the inside of the proximal end of the elongated body 110. As shown in FIGS. 13-16, the size and shape of the orifice 130*b* may be effectively changed by using flow restrictors 134 with openings of different diameters. For example, in one embodiment the opening 138 within the flow restrictor may be about 0.50 inch in diameter. In another embodiment, the opening may be about 0.625 inches to about 0.75 inches in diameter.

In one embodiment, the inlet end 130*a* includes a plurality of threads machined into the outer surface of the inlet end 130*a*, as shown in FIG. 9. The threads may be used to connect a water source (not shown) using a quick connect hose connector 132, as shown in FIG. 8. The hose connector 132 may include mating threads on the inside surface thereof and be configured to attach a hose or water source used by fire and police departments or found in the emergency sections of manufacturing facilities.

Figure 4:
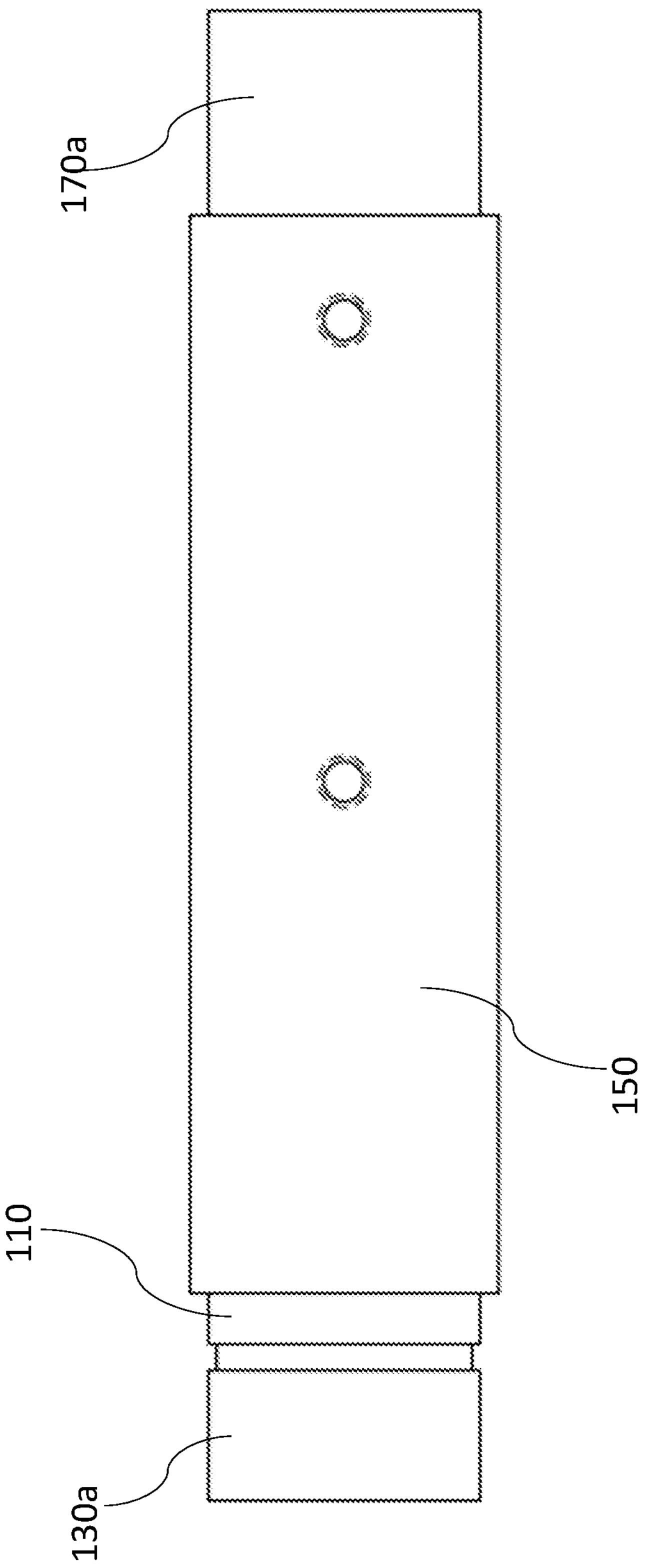
FIG. 4 is a bottom view of one embodiment of an elongated body and cradle of a spray nozzle.

Referring now to FIGS. 1-3 and 5, along the elongated body 110 are a plurality of holes 120 configured to allow fluid to exit the elongated body 110 at desired predetermined angles. The plurality of holes 120 are spaced, shaped, and sized to spray fluid at various desired degrees relative to the vertical axis (A) of the center of the tubular elongated body. For example, as illustrated in FIGS. 6 and 8-11, the plurality of holes 120 may be machined through the thickness of the elongated body at various predetermined angles and spaced, shaped, and sized to spray fluid over an area about 192 in. by about 96 in. The plurality of holes 120 are further configured to spray fluid at least 8 inches in upwards from the outer surface of the elongated body 110. "About" as used in this embodiment is +/−Sin. FIG. 4 depicts one example of a spray pattern of fluid in one embodiment of the spray nozzle 100. FIGS. 6-9 depict other examples of the spray pattern of fluid in another embodiment, with the vectors 190 illustrating the angle and direction of fluid leaving each hole 120.

Figures 7A, 7B, 7C:
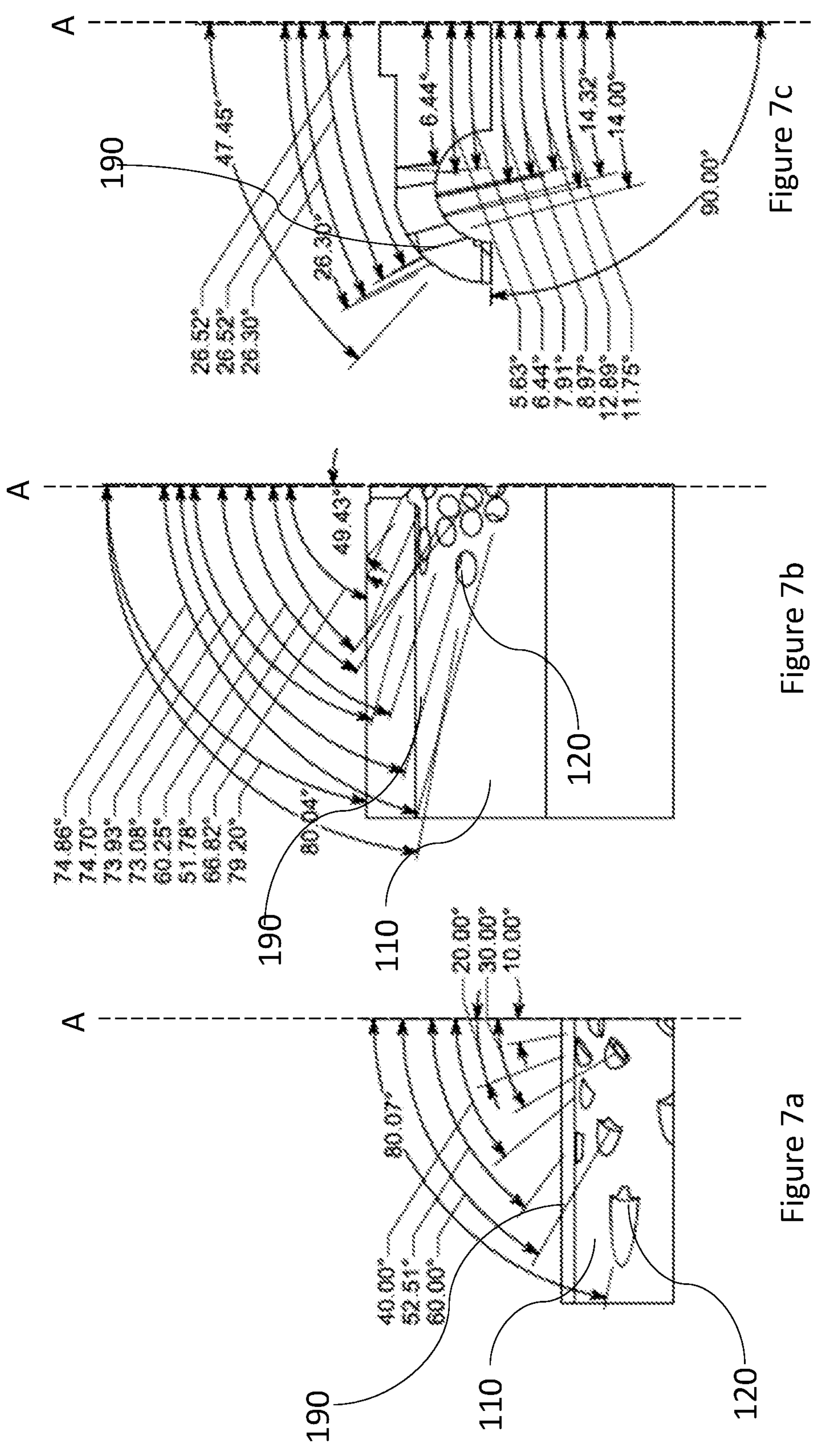
FIGS. 7*a, b*, and *c* are illustrations of spray angles from holes in one embodiment of a spray nozzle.

FIGS. 7*a, b*, and *c* depict one example of the geometry of the holes 120 resulting in the spray coverage from a top, side and end view. Referring specifically to the top view, the angles of spray from each hole 120 may range from about 10° to about 81° from the vertical axis A. "About" in this embodiment is +/1°. For example, the spray angles may start on one side of the tubular elongated body 110 at about 10° from the vertical axis A of the center of the body 110 and continue to be configured to spray at angles of about 20°, 30°, 40°, 52.5°, 60°, and 80.07° from the vertical axis disposed at the center of the body 110. At the other side of the elongated body 110, the spray angles may start about −10° from the vertical axis A of the center of the body 110 and continue to spray at angles of about −20°, −30°, −40°, −52.5°, −60°, and −80.07°. At these angles, the spray of fluid may evenly, or almost evenly, distribute fluid across the spray range of about 192 in.×96 in.×8 in.

Figure 5:
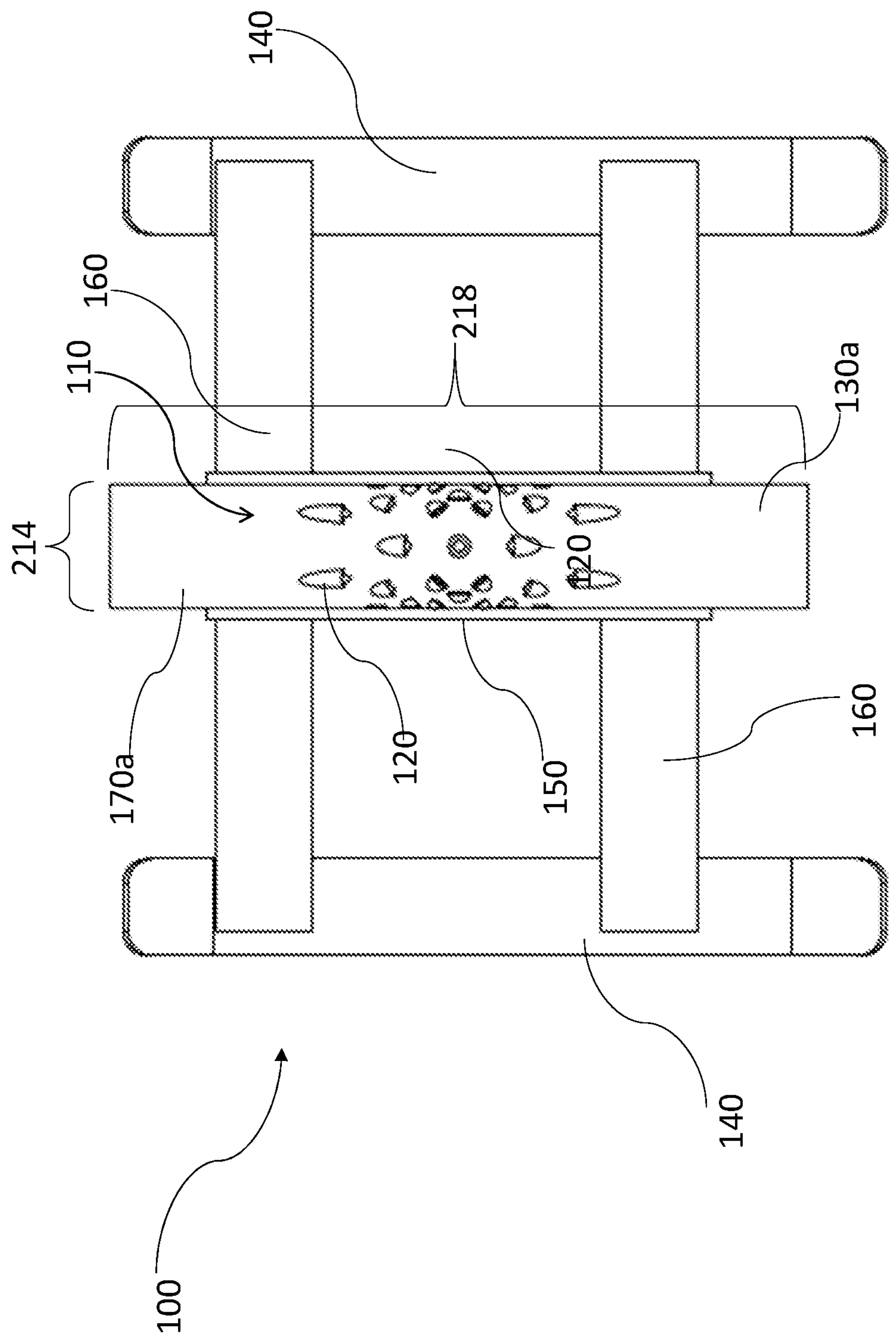
FIG. 5 is a top view of one embodiment of a spray nozzle.
Figure 6:
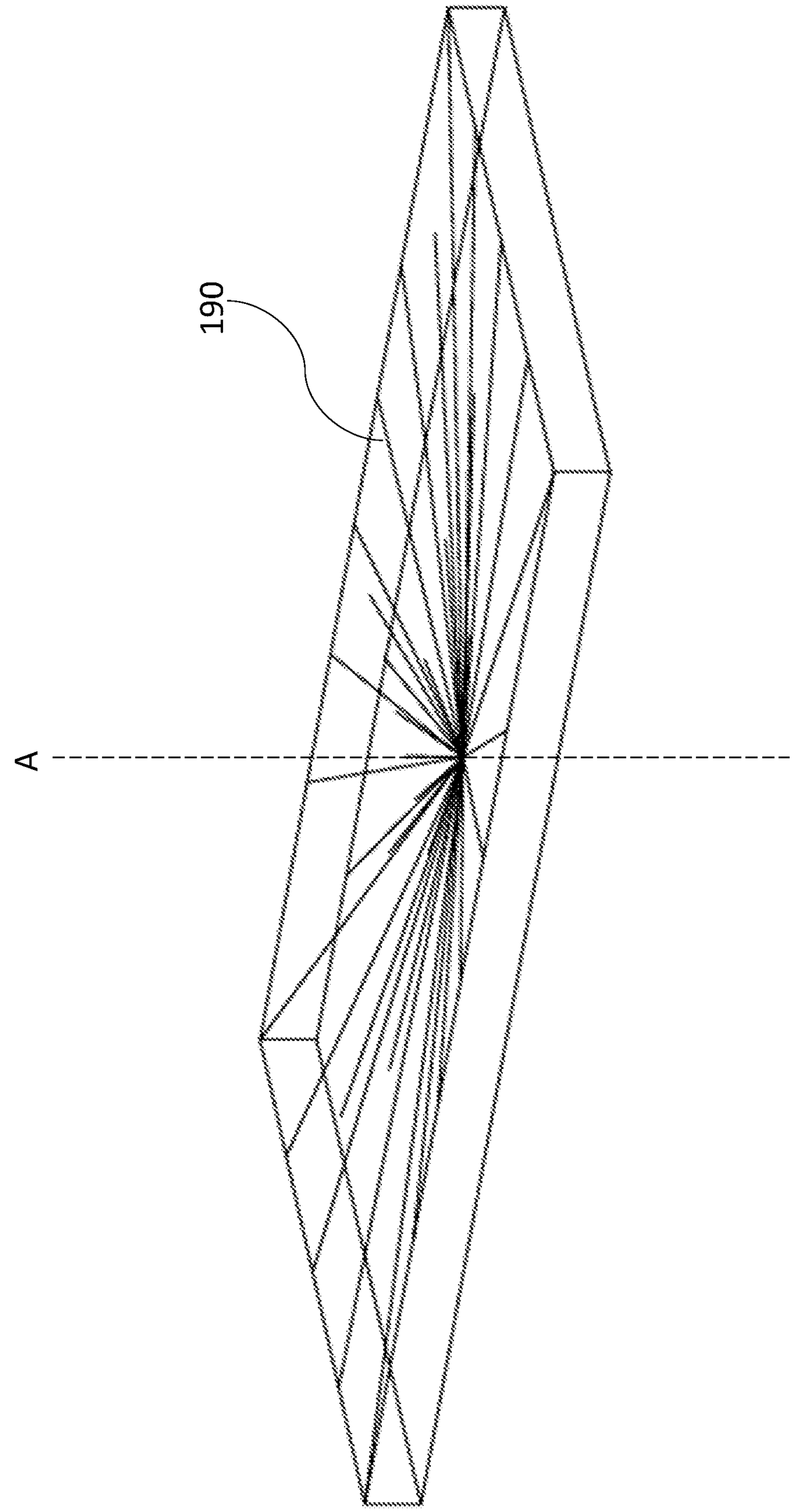
FIG. 6 is depiction of a spray pattern of one embodiment of a spray nozzle.

In one embodiment, as shown in FIGS. 1 and 5, the body 110 may be stabilized on the ground by braces 160, which are attached to skids 140 by any generally acceptable method of attachment, such as welding, bolting, or may be integrally formed. The elongated body 110 may be fixedly attached to the braces 160 by a cradle 150. The cradle 150 may attach the body 110 to the braces 160 by any reasonable means, such as by welding for metal materials. In one embodiment, the cradle 150 is a separate component that is fixedly attached to the elongated body 110. In another embodiment, the cradle 150 is integrally formed with the elongated body 110. The braces 160 are numbered and placed substantially perpendicularly along the length of the elongated body 110 to evenly distribute the weight of the elongated body 110, allowing the elongated body 110 to be parallel to the ground. In one embodiment, the elongated body 110 is attached to two braces 160, however it should be understood that more than two braces 160 may be needed, depending on the size of the elongated body 110.

The skids 140 are attached perpendicularly to the braces 160 such that they are substantially parallel to the elongated body 110. They offer further support to the elongated body 110, aiding in positioning the elongated body 110 in the desired location on the ground. In one embodiment, the skids 140 may be the only elements of the spray nozzle 100 to touch the ground, allowing the spray nozzle to slide over the ground with little resistance. The braces 160, cradle 150, and skids 140 may be made of any suitable materials, such as aluminum, stainless steel, steel, etc.

When using the spray nozzle 100 to cool and/or extinguish a battery fire in an electric vehicle, the spray nozzle 100 is positioned beneath the vehicle between the axles and sides of the vehicle. In the embodiment discussed above, the holes 120 are spaced, shaped, and sized are configured to spray fluid from about 10° to about 81° from the center point of origin. In a further embodiment, when a spray nozzle 100 with holes configured the same is positioned beneath the vehicle between its axles and sides, the spray nozzle 100 may spray every 3 square foot of the underside of the vehicle.

Referring now to FIG. 17, the spray nozzle 100 may be connected to a fan nozzle 330 through the inlet end 130*a* to form system 300. A fan nozzle 330 sprays fluid, such as water, in a fanned-out manner. For example, in one embodiment, the fluid enters the fan nozzle 330 at the base 340 of the fan nozzle 330 and exits an elongated opening 350 in the head 360 of the fan nozzle 330 at angles of −90° to 0° to 90°, relative to the vertical axis B of the center of the fan nozzle 330, with minimal to no fluid exiting the fan nozzle at angles of −180° to 0° to 180° relative to the horizontal axis of the center of the fan nozzle 330. This forms a partial "wall" of spray of fluid exiting the fan nozzle 330.

When using the fan nozzle 330 to cool and/or extinguish a battery fire in a vehicle, the fan nozzle 330 is positioned outside the vehicle, directing spray towards the vehicle. In one embodiment the spray is directed towards the side of the vehicle. This offers a cooling and/or extinguishing spray to the outer body of the vehicle. In another embodiment, the spray is directed above the vehicle. This offers a heat shield for people on the other side of the spray. For example, the partial "wall" of spray of fluid exiting the fan nozzle 330 may form a barrier outside the vehicle which slows or prevents heat from emitting through the spray.

When the fan nozzle 330 is attached to the spray nozzle 100, the two nozzles may form a system 300 that sprays fluid in each nozzle's spray pattern simultaneously. In one embodiment the system 300 is used to extinguish a vehicle fire. In this embodiment, the spray nozzle 100 is placed beneath a vehicle, and the fan nozzle 330 is directed above the vehicle. When used with electric vehicles, the system 300 may cool/extinguish battery fires underneath the vehicle, while forming a heat shield for people outside the vehicle on the other side of the fan nozzle 330 spray. This method of cooling/extinguishing fires requires less fluid than typical extinguishing means, such as by a fire hose, thus resulting in less run off and less contamination of the surrounding area.

The fan nozzle 330 may be attached to the spray nozzle 100 through any suitable means. In one embodiment, piping 380 connects the two nozzles. The piping 380 may be sized to create the desired distance between the nozzles. For example, multiple pipes 380*a* and 380*b* may be connected, which may ease storage, transport, and maintenance. In one embodiment the piping 380*a* and 380*b* are sized at 30 in. in length each. The piping 380 may connect the base 340 of the fan nozzle 330 to the inlet end 130*a* of the spray nozzle 130*a*. Accordingly, as fluid flows into the fan nozzle 330, fluid exits the elongated opening 350 of the fan nozzle 330 simultaneously as it flows through the piping 380, where the fluid enters the spray nozzle 100 through the inlet orifice 130*b* of the inlet end 130*a* and exits the holes 120 of the body 110.

The piping 380 may be removably attached to each nozzle and to other piping by any suitable means, preferably by removable means, such as using machined threading. In one embodiment the nozzles 100 and 330 are attached to the piping 380 by quick release couplings 400 and 410. Additionally, braces and/or skids may be attached to the piping to stabilize the piping and maintain the orientation of the nozzles.

In another embodiment, rather than attaching a fan nozzle to the inlet end 130*a*, as discussed above, the same methodology could be used to attach additional spray nozzles 100 in sequence to allow the user to treat or combat fires on larger vehicles, such as SUVs, buses, tractor trailers, or airplanes, or along long stretches of factory floors.

In yet another embodiment, upstream from the spray nozzle 100, a mechanism may be attached to the piping 380 and/or inlet end 130*a* that adds additives to the fluid through dosing before the fluid enters the elongated body 110 and exits the holes 120. In one embodiment, the mechanism adds an insulating compound to the fluid stream and surfactants. One such example compound is water soluble vermiculite. When placed under a vehicle, the insulating compound and fluid mixture exits the spray nozzle 100 and coats the underside of the vehicle. As water evaporates, this will provide insulation around the heated elements of the vehicle, thus also minimizing the risk of adjacent materials (such as batteries) combusting and also aiding in containing the fire. In one embodiment, the dosing mechanism is a block containing an additive, where the dosing rate is about 1000 gallons of water per application of additive. "About" in this embodiment means+/−50 gallons. The block may be any suitable size, such as 200 mm×100 mm×50 mm. It should be appreciated that the dosing mechanism may be other shapes and sizes.

| GPM | 100% Cooling MW/s | 85% Cooling MW/s | Water Run Off 15% | 507.42857 | | | |
|---|---|---|---|---|---|---|---|
| Flow 74.3 L/Min 281.2561 | 14.06 | 11.95 | | voltage | 3.6 | of Batter Cell | |
| | | | | Number of Batteries | 7104 | | |
| | | | | Number of cells | 14 | in battery pack | |
| | | | | Charge state of Battery | 100 | % of full charge | |
| | | | | Burn time of Battery | 30 | Seconds | |
| | | | | Burn Temp of Battery | 3000 | Deg F. | |
| L/Sec 4.687602 | Accumulation Energy in burn time Mega Watts | Heat Generated Per S battery Pack total MW/s | Heat generated Per Battery MW/s | heat energy produced | Kj/cell | Variance | Max Kj/S |
| KG/sec | 13.42656 | 0.447552 | 0.000063 | LCO | 37.3 | +−3.3 | 63 |
| 4.687602 | 17.26272 | 0.575424 | 0.000081 | NMC | 34 | +−1.8 | 81 |
| MJ/S | 10.656 | 0.3552 | 0.00005 | LEP | 13.7 | +−.4 | 50 |
| 14.0628 | | | | | | | |

This written description sets forth the best mode of carrying out the invention and describes the invention so as to enable a person of ordinary skill in the art to make and use the invention, by presenting examples of the elements recited in the claims. The detailed descriptions of those elements do not impose limitations that are not recited in the claims, either literally or under the doctrine of equivalents.

What is claimed is:

1. An apparatus for containing electric vehicle fires comprising:

a spray nozzle configured to spray fluid along the underside of an electric vehicle comprising:

an elongated body, the elongated body having a proximal end comprising an inlet orifice, a closed distal end, and a length extending between the proximal end and the distal end;

wherein the length of the elongated body has a thickness and a plurality of holes disposed through the thickness of the length;

wherein each of the plurality of holes are disposed through the thickness of the elongated body at a predetermined angle relative to a vertical axis disposed through a center of the elongated body; and wherein plurality of holes are disposed through the thickness at least two different angles relative to the vertical axis of the elongated body;

a cradle configured to receive the length of the elongated body;

at least a first brace and a second brace attached to the cradle; and at least a first skid and a second skid attached to the first brace and the second brace; wherein the first brace, second brace, first skid and the second skid are configured to support the movement of the elongated body of the spray nozzle over a surface;

a fan nozzle configured to spray fluid in a vertical direction along and above the outside of the electric vehicle; and a length of pipe disposed between a distal end of the fan nozzle and the proximal inlet end of the spray nozzle.

2. The spray nozzle of claim 1, wherein the spray nozzle further comprises a cap that is configured to be removably attached to the distal end of the elongated body.

3. The spray nozzle of claim 1, wherein the inlet orifice has a diameter of about 0.20 inch to about 0.75 inch.

4. The spray nozzle of claim 3, wherein the spray nozzle further comprises a flow restrictor capable of being disposed within the inlet orifice of the proximal end of the elongated body, the flow restrictor comprising a body configured to fit within the inlet orifice and an opening through at least one surface of the body, wherein the opening is configured to reduce the diameter of the inlet orifice of the elongated body.

5. The apparatus of claim 1, wherein the plurality of holes are disposed at a first side surface, top surface, and second side surface of the length of the elongated body, and wherein the predetermined angles of the plurality of holes are configured to be from 20° to −20° relative to the vertical axis of the elongated body.

6. The apparatus of claim 5, wherein the plurality of holes disposed from the first side surface to the top surface have predetermined angles of about 20° to about 29°, 30° to about 39°, about 40° to about 49°, about 50° to about 59°, about 60° to about 69°, about 70° to about 79°, and about 80° to about 89° relative to the vertical axis and the plurality of holes disposed from the second side surface to the top surface have predetermined angles of about −20° to about −29°, −30° to about −39°, about −40° to about −49°, about −50° to about −59°, about −60° to about −69°, about −70° to about −79°, and about −80° to about −89° relative to the vertical axis.

7. A method of containing an electric vehicle fire comprising:

providing a spray nozzle comprising:

an elongated body, the elongated body having a proximal end comprising an inlet orifice, a closed distal end, and a length extending between the proximal end and the distal end;

wherein the length of the elongated body has a thickness and a plurality of holes disposed through the thickness of the length; and wherein each of the plurality of holes are disposed through the thickness at a predetermined angle relative to a vertical axis disposed through a center of the elongated body;

a cradle configured to receive the length of the elongated body;

at least a first brace and a second brace attached to the cradle; and at least a first skid and a second skid attached to the first brace and the second brace; wherein the first brace, the second brace, the first skid and the second skid are configured to support the movement of the elongated body of the spray nozzle over a surface;

providing a fan nozzle configured to spray water along and above the outside of the vehicle;

attaching a length of pipe between a distal end of the fan nozzle and the proximal inlet end of the spray nozzle; and wherein a water source is attached to the proximal inlet end of the spray nozzle through the length of pipe and the fan nozzle:

positioning the spray nozzle below an underside of the vehicle; and delivering water through the plurality of holes in the spray nozzle so that the water is directed to the underside of the vehicle at a plurality of predetermined angles and along and above the outside of the vehicle through the fan nozzle.

8. The method of claim 7, wherein the plurality of holes are disposed at a first side surface, top surface, and second side surface of the length of the elongated body, and wherein the predetermined angles of the plurality of holes are configured to be from 20° to −20° relative to the vertical axis of the elongated body.

9. The method of claim 8, wherein the plurality of holes disposed from the first side surface to the top surface have predetermined angles of about 20° to about 29°, 30° to about 39°, about 40° to about 49°, about 50° to about 59°, about 60° to about 69°, about 70° to about 79°, and about 80° to about 89° relative to the vertical axis and the plurality of holes disposed from the second side surface to the top surface have predetermined angles of about −20° to about −29°, −30° to about −39°, about −40° to about −49°, about −50° to about −59°, about −60° to about −69°, about −70° to about −79°, and about −80° to about −89° relative to the vertical axis.

* * * * *